Oct. 27, 1936.  A. J. SCHOLTES  2,059,040
INTERLOCKING HOSE COUPLING AND SEAL
Filed Feb. 27, 1936  2 Sheets-Sheet 1

Inventor
Albert J. Scholtes
By Mawhinney & Mawhinney
Attorneys.

Oct. 27, 1936.　　　A. J. SCHOLTES　　　2,059,040
INTERLOCKING HOSE COUPLING AND SEAL
Filed Feb. 27, 1936　　　2 Sheets-Sheet 2
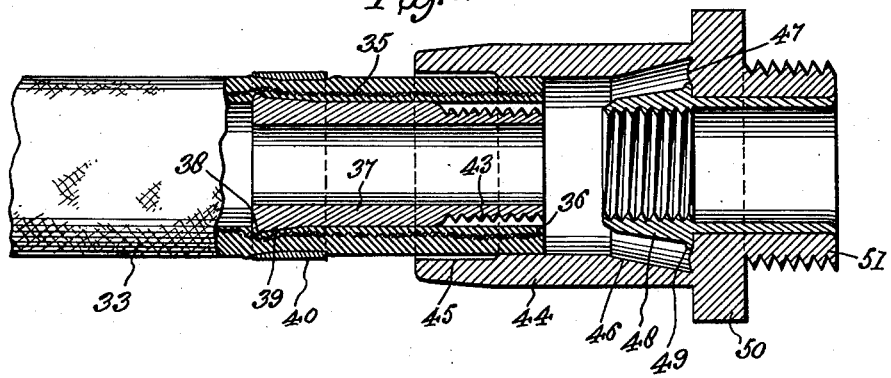
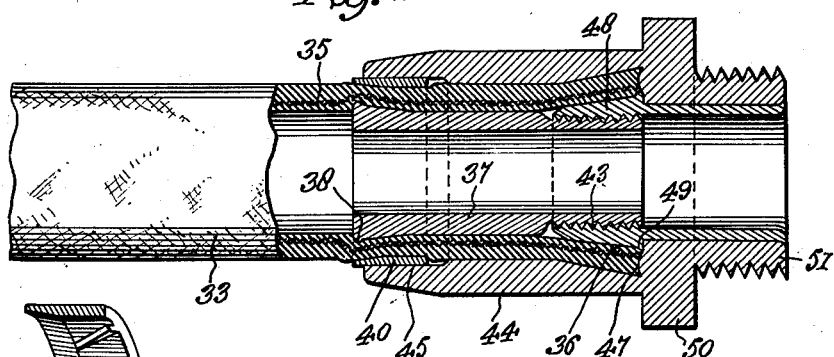
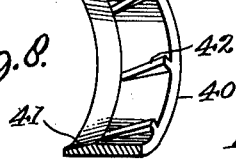
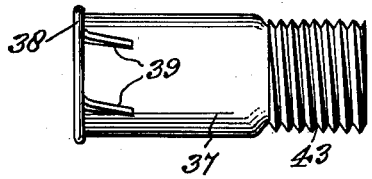
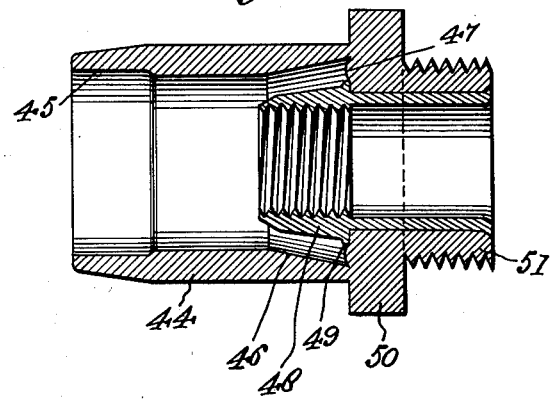
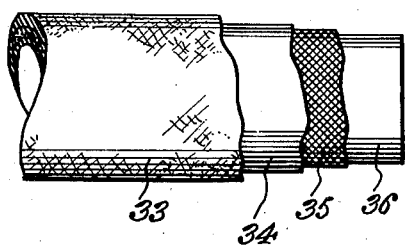
Inventor
Albert J. Scholtes
By Mawhinney & Mawhinney
Attorneys.

Patented Oct. 27, 1936

2,059,040

UNITED STATES PATENT OFFICE 2,059,040

INTERLOCKING HOSE COUPLING AND SEAL

Albert J. Scholtes, Baltimore, Md.

Application February 27, 1936, Serial No. 66,109

18 Claims. (Cl. 285—77)

The present invention relates to hose couplings, and more particularly to a coupling adapted for use with gasoline hose, or the type of hose adapted particularly for carrying gasoline, oils, greases, and the like, and for use with the particular type of hose having a spiral metal lining for electrically grounding the hose and which is provided with an outer layer of rubber or the like.

It is known that in couplings heretofore used, depending upon the outside sealing and clamping feature, gasoline and the like seeps around the end of the hose and between the layers of the rubber and the spiral inlaid or woven wire reinforcement, particularly synthetic rubber hose wherein a chemical action is set up, and quickly destroys it.

It is a purpose of the present invention to provide an inner and an end seal, without destroying the electrical contact necessary, which will prevent the gasoline or other liquid in the hose from passing around the inner layer into contact with the reinforcement and to provide a seal with the end of the hose against the intermediate layer, particularly in hose having a spiral inlaid wire reinforcement.

Another object of the invention is to provide a coupling wherein an inner anchoring action and a powerful end thrust action are provided to force the end of the hose into an effective seal and without the use of a special tool or the employment of expanding methods to secure the anchoring effect.

A still further object of the invention is to provide a coupling for hose of the inner armored type wherein the armor is compressed endwise of the hose and expanded at the end of the hose so as to retract the armor into the inner layer of the hose and project the outer layers into sealing contact with a thrust shoulder or seat at the same time maintaining the required electrical grounding connection of the innerlining material through the coupling.

With the foregoing and other objects in view, the inventon will be more fully described hereinafter, and will be more particularly pointed out in the claims appended hereto.

In the drawings, wherein like symbols refer to like or corresponding parts throughout the several views:

Figure 6 is a longitudinal sectional view taken through a slightly modified form of the coupling as applied particularly to a hose which has an intermediate wire or woven metal reinforcement showing the coupling partly applied to the end of the hose.

Figure 7 is a similar view showing the coupling in fully applied position.

Figure 8 is a detail perspective sectional view of a portion of the outer clamping ring used in the modified form.

Figure 9 is a detail side elevation of the anchoring nipple of the modified construction.

Figure 10 is a detail longitudinal section taken through the body or sleeve member of the coupling, and Figure 11 is a plan view of a portion of the hose with the various layers broken away to show one form of hose to which the modified construction of coupling may be applied.

Figure 1:
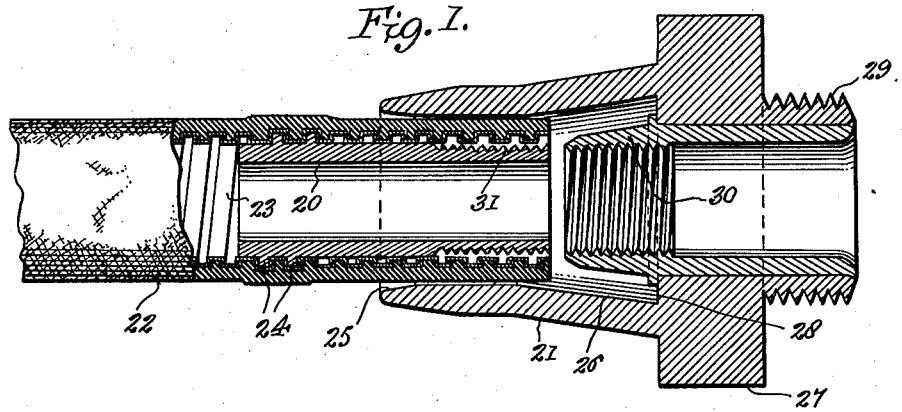
Figure 1 is a longitudinal central section taken through a hose coupling embodying the features of this invention and as partly applied to a gasoline hose of the metal armored innerlining type.
Figure 2:
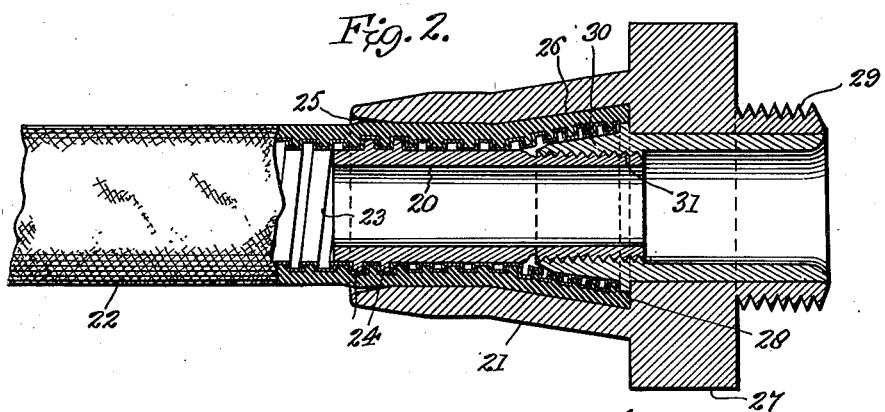
Figure 2 is a like view showing the coupling in applied position on the hose.
Figure 3:
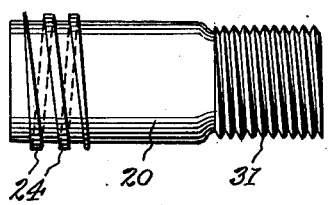
Figure 3 is a detail side elevation of the anchoring nipple of the coupling.
Figure 4:
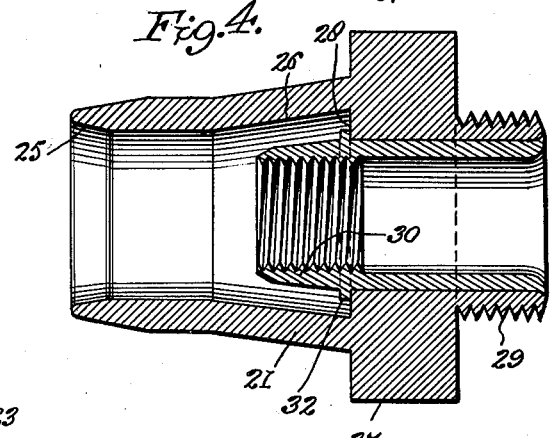
Figure 4 is a detail longitudinal section of the body or sleeve part of the coupling.
Figure 5:
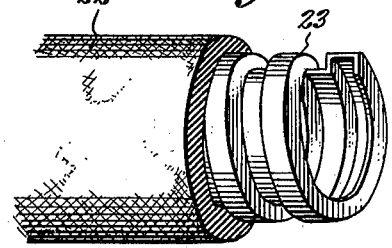
Figure 5 is a fragmentary sectional view of an end of the metal spiral lining hose, showing parts broken away to show the convolutions of the innerliner.

Referring now to the drawings, and first to the form of the invention shown in Figures 1 to 5, inclusive the coupling comprises substantially but two members, an anchoring nipple 20, shown in Figure 3, and a sleeve or body part 21 shown in Figure 4. The nipple 20 is proportioned to fit in the end of a length of hose 22 which may be of the type shown in Figure 5 with a spiral metal armor 23 of any suitable cross-sectional configuration and which has the outer layer or body part of rubber or the like supported upon the innerliner 23 as shown in Figure 5. The result is that the innerliner 23 brings to the inner wall of the hose a spiral groove or thread, which is characteristic also of spiral inlaid wire reinforcement, and the present invention takes advantage of this inherent thread structure of the hose to accomplish the anchoring of the nipple 20 therein. The nipple 20 is hollow, as shown in Figures 1 and 2, and is provided upon its inner end and outer surface, as shown in Figure 3, with a spiral anchoring rib 24 which conforms to the pitch and cross-sectional shape of the spiral innerlining 23, or the spiral impressions of the spiral inlaid reinforcement type of hose, so that the nipple 20 may be turned up into the end of the hose as shown in Figure 1 to a point where the outer end of the nipple is substantially flush with the end of the hose 22. The outer end of the nipple 20 is reduced exteriorly and threaded, the threads providing a feeding means for forcing the outer or sleeve part of the coupling over the end of the hose and to effect the expanding and compression actions hereinafter brought out.

The sleeve or body part of the coupling is shown in detail in Figure 4 and comprises a sleeve portion which is interiorly smooth, and which is adapted to slide freely over the outer surface of the end of the hose 22, the outer end of the sleeve 21 having preferably an end flare 25 at its inner wall for facilitating the guiding and passage of the sleeve onto and over the end of the hose, and to secure and lock against the sleeve the enlarged portion of the hose opposite to spiral thread 24 of the nipple 20. The sleeve 21 may be of substantially uniform diameter at its outer or free end portion but preferably flares at its inner wall portion to provide an inwardly flaring pocket 26 in the inner end of the sleeve. The sleeve 21 terminates at its inner end in a nut portion 27 or the like to facilitate turning of the body or the coupling, and the nut portion is substantially integral with the sleeve and extends inwardly thereof to provide a shoulder 28 forming the inner wall of the pocket 26 and against which the extremity of the hose 22 is adapted to abut. The nut 27 is provided at its inner side with an externally threaded spud or a tail piece 29 for the reception of other coupling or attachment parts, and the body or sleeve part of the coupling is provided within the inner end of the sleeve with an internally threaded cone 30 having an outer conical surface cooperating with the inner flaring wall of the sleeve 21 to provide the spaced concentric walls of the pocket 26. The outer end of the cone 30 is reduced and beveled so as to enter the end of the hose 22 between the metal lining 23 thereof and the reduced threaded end 31 of the anchoring nipple. The cone 30 is adapted to be threaded on to the nipple 20 by turning the entire body part of the coupling about the end of the hose, and the smooth inner surface of the sleeve 21 admits the turning of the body part without damage to the outer surface of the hose. The cone 30 and the reduced end 31 of the nipple have the threads disposed at a relatively fine pitch as compared with the coarse spiral threads of the metal liner 23 of the hose so that the cone 30 turns with a slow advancement into the end of the hose as compared with the turning or threading of the inner end of the anchoring nipple 20 into the spiral threads of the hose liner. The result is that the cone 30 is wedged into and against the spiral liner 23 and is turned in such a direction as to engage the convolutions of the liner by frictional contact to partially expand or unwind the metallic liner with the result that the liner is expanded and the cone may enter with reduced resistance into the end of the hose and with the spiral inlaid reinforced type hose, and with an expanding action thereon as clearly shown in Figure 2. As the cone 30 is drawn inwardly the convolutions of the metal liner 23 are not only expanded but are compressed together so as to retract the end of the liner 23 within the outer layer or body part of the hose 22, the result being that when the extremity of the hose reaches the shoulder or wall 28, the yieldable outer layer of the hose projects beyond the metal liner and may be compressed and effectively sealed against the shoulder or wall 28 at the inner end of the pocket. The turning out or backing off the sleeve 21 causes the liner 23 or wire spiral, when used, to reduce the inside diameter of the hose, causing a contraction or tighter hugging of the hose on both the anchor thread 24 and the cone 30. This compression and expansion of the free end of the hose results in a compression of the hose from its free extremity back to substantially the plane of the inner end of the anchoring nipple 20, or where the spiral threads 24 of the nipple innerlock with the metal liner. The hose 22, under this compressing action, expands not only in the pocket 26 but against the inner wall of the sleeve 21 throughout substantially the length of the sleeve to provide an effective seal of the sleeve over the hose end, particularly during the last few turns of the cone 30 over the anchoring nipple and during the compression of the extremity of the hose against the sealing shoulder 28.

The single nipple thread 24 may be of double thread or other suitable construction to accommodate more particularly, if desired, the double spiral wire reinforcement found in some types of hose.

The cone 30 is provided with an annular rib 32 about its inner end or base portion, and the rib 32 lies immediately in front of the shoulder 28 and is of considerably less thickness than the shoulder or wall 28 for projecting into the inner layer of the hose 22 and receiving the end thrust of the metal liner 23 thereagainst. This holds the metal liner in radially expanded and longitudinally compressed condition and thus effectively maintains the end of the hose in compressed and expanded position within the pocket 26. Of course the body portion of the coupling may be made in one or more parts, as best suits conditions of manufacture but it is important that the shoulder 28 be effectively sealed or integral with the inner end of the sleeve 21 so that the compressed extremity of the hose will be held from expansion at any point to prevent seepage of gasoline or other materials passing through the hose.

It will be noted that the spiral threads or bead 24 on the inner end of the nipple 20 registers with the spiral groove of the liner so that as the cone 30 is turned up on the outer end of the nipple, any tendency to turn the anchoring nipple 20 with the cone or body part of the coupling has the result of further screwing or feeding in the nipple into the hose and its lining. The spiral bead 24 is coarse and the advancement, when turned into the lining, is rapid as compared with the advancement of the cone 30 over the fine threads 31. Therefore the anchoring effect on the nipple 20 becomes stronger incident to any turning of the nipple in the direction of the feeding of the cone.

Referring now to the modified form shown in Figures 6 to 11, the coupling is shown in one embodiment as applicable to a hose 33 which may be of the composite form shown in Figure 11 having an outer layer of woven fabric, such as canvas or the like beneath which is placed a layer of rubber 34 reinforced by wire braid 35 and provided with an inner lining 36 of rubber or the like.

The coupling is provided with an anchoring nipple 37, shown in Figure 9 particularly, and at its inner end is provided with an anchoring bead 38 which projects beyond the outer surface of the nipple for engagement in the inner lining or wall 36 of the hose as shown in Figures 6 and 7. Extending obliquely or spirally inward from the bead 38 are a number of spaced apart inwardly tapering ribs 39 which are of less height than the bead 38 and which are inclined spirally in one direction to facilitate the insertion of the nipple 37 into the end of the hose by a turning or screwing action. The nipple 37 is advanced into the end of the hose until the outer end of the nipple is substantially flush with the extremity of the hose, as shown in Figure 6, when an outer clamping ring or band 40 is forced over the end of the hose and up into position substantially opposite the bead 38 and the ribs 39. This ring 40 is relatively rigid, is provided with a flaring inner wall 41 at its outer end adapted to wedge over the portion of the portion of the hose 33 which is supported upon the bead 38 to effect a pinching and clamping action upon the hose to firmly anchor the nipple 37 therein. The inner surface of the clamping ring 40 is provided with a plurality of spaced apart spirally or diagonally arranged ribs 42 which preferably increase in depth toward the inner end of the clamping ring, as shown in Figure 8 and which are adapted to be disposed in offset or staggered relation with respect and substantially parallel to the ribs 39 of the nipple to engage and crimp the intervening portion of the hose between the nipple and the clamping ring. This insures a firm anchorage for the nipple in the end of the hose.

The outer end of the nipple 37 is reduced and threaded as at 43 and the threads thereof are relatively fine.

The body part of the coupling is fitted over the end of the hose and comprises an outer sleeve 44 having a smooth inner surface and which has its inner wall counter-bored as at 45 at the inner end of the body portion to slidingly and rotatably fit over the smooth outer surface of the clamping ring 40 as shown in Figure 7. The intermediate portion of the sleeve 44 is substantially cylindrical at its inner wall while the inner end of the sleeve has its inner wall flared as at 46 for accommodating the extremity of the hose 33 when expanded. The inner end of the sleeve 44 is provided with a preferably integral inner wall 47 which is preferably convex in contour so as to press into and seal the extremity of the hose 33 and make electrical contact with the metal interliner 35 of the hose, when the body member is forced over the end of the hose. The convex wall 47 provides inner and outer annular pockets into which the inner and outer edges of the hose extremity may expand to effect a tight seal of the extremity of the hose as clearly shown in Figure 7. Within the inner flaring end of the sleeve 44 is placed an expanding cone 48 the outer surface of which is conical and spaced from the inner flaring wall of the sleeve 44 to provide therewith, and with the end wall 47, a closed and sealed pocket for the reception of the extremity of the hose 33. The inner or base end of the cone 48 is provided with an annular shoulder 49 which extends outwardly from the wall 47 immediately adjacent the cone 48 so as to effect the increased compression or the inner layer or lining 36 of the hose as the body portion of the coupling is forced into place. This construction causes the extremity of the hose to flare to a greater extent and to compress the outer layers of the hose more forcibly against the wall 47 and the flaring wall 46 of the sleeve. The expanding cone 48 is suitably reduced at its free end to enter the space between the threaded end 43 of the nipple and the inner wall of the hose 33, and the interior of the cone 48 is threaded to correspond with the threads of the end 43 of the nipple, and the entire body portion is adapted to be turned over the end of the hose so that the cone 48 may advance over the end of the nipple and into the end of the hose. The wall 47 comprises the inner portion of a nut 50 of the body portion to facilitate turning of the body portion during its advance over and into the end of the hose, and a spud or tail piece 51, externally threaded, extends from the outer side of the nut 50 for attaching the coupling to nozzles, other couplings or the like.

After the nipple 37 has been anchored in the end of the hose, as shown in Figure 6, the body portion of the coupling is slid over the end of the hose until the cone 48 engages the threaded end 43 of the nipple. The body portion is now turned, the nipple being held from turning by its anchoring means, and the cone is thus forcibly fed into the end of the hose as the latter is expanded and compressed over the outer surface of the cone 48. The sleeve 44 does not disrupt the outer surface or layer of the hose 33 but merely slides and turns thereover during the operation of applying the coupling. As the cone 48 is advanced into the end of the hose, the latter is expanded into the flaring pocket within the sleeve 44 and is compressed longitudinally between the inner anchored end of the nipple and the extremity of the hose so that the end of the hose is not only effectively sealed upon the cone 48 but also against the inner wall of the sleeve 44. The abutment wall or shoulder 47 of the body portion presses into the extremity of the hose as the latter rides up upon the cone so that the extremity of the hose is deformed and spread over the convex face of the wall 47 and over the annular shoulder 49 causing the end of the hose to be sealed not only against the base of the cone 48 but also against the convex face and the inner flaring wall 46 of the sleeve 44.

In both forms of the invention, and in various other modifications within the scope of this invention, the coupling comprises an anchoring nipple or member which is secured within the hose so that rotation will only tend to force the anchoring nipple deeper into the hose so that the nipple will not turn or pull out of the hose.

What is claimed is:

1. A coupling for gasoline and the like hose, comprising an internally smooth sleeve for engagement over the end of a hose and having at its inner end a conical internally threaded projection of reduced diameter providing a flaring sealed pocket within the sleeve for the end of the hose, and an anchoring element adapted to be placed in the hose having a threaded portion for engagement in said projection, whereby turning of the sleeve about the end of the hose advances the conical projection therein and expands and compresses the end of the hose over the conical projection and into said pocket for sealing the extremity of the hose therein.

2. A coupling for gasoline and the like hose, comprising a body part having an internally threaded cone portion for engagement in the end of a hose to expand the same and having an enclosing sleeve part spaced about the cone part for slipping over the end of the hose and having an enclosed conical annular jacket between the cone and sleeve parts terminating in an abutment shoulder for compressing the hose and sealing the end of the same in the body part, and an anchoring nipple adapted for positioning in the end of the hose and having a threaded outer end to receive the cone part thereon, said body part adapted to be turned to turn the cone portion up on the nipple and into the end of the hose to expand and compress the end of the hose into said enclosed pocket and against the shoulder to seal the end of the hose.

3. A coupling for gasoline and the like hose, comprising a nipple having external anchoring means on its inner end adapted for insertion in the end of a hose and for anchorage against the inner wall of the hose, said nipple having external threads on its outer end, and an outer sleeve member for free passage over the end of the hose and having therein an internally threaded coupling part for threaded engagement over the threaded outer end of the nipple and into the end of the hose for drawing the sleeve thereover and compressing the end portion of the hose, said coupling part having a conical outer surface for expanding the end of the hose during compression and the surrounding portion of the sleeve having a corresponding conical inner wall portion providing a closed pocket between the sleeve and the coupling part for the reception of the expanded and compressed end of the hose, and the sleeve having an integral inwardly extending annular seat extending to said coupling part to receive thereagainst and seal the end of the hose.

4. A coupling for hose, comprising a sleeve for engagement over the end of a hose and having a conical projection within its inner end to engage within the end of the hose providing an annular flaring pocket between the projection and the sleeve to radially expand and longitudinally compress the end of the hose as it passes over the projection, and an anchoring element adapted to be secured in the hose inwardly of the end thereof and adjustably connected to said cone and sleeve, whereby said cone and sleeve may be advanced against the extremity of the hose for expanding and compressing the end of the hose against the sleeve and seal the extremity of the hose against the inner end of said pocket.

5. A hose coupling, comprising a sleeve for engagement over the end of a hose, said sleeve having an annular abutting wall at its inner end and the sleeve flaring backwardly from an intermediate point to the outer marginal edge of the wall, said sleeve also having a cone projecting forwardly from the inner marginal edge of the wall into the flaring portion of the sleeve for entering the end of the hose, and advancing and holding means for the sleeve to move the same over the end of a hose and to feed the cone into the end of the hose to expand the latter over the cone and compress the end of the hose against said wall and the flaring portion of the sleeve.

6. A hose coupling, comprising a sleeve for engagement over the end of a hose and having a flaring inner wall part terminating in an annular abutment face at its inner end, said sleeve having a cone extending from the abutment face into the flaring wall portion of the sleeve and spaced therefrom to receive the end of a hose expanded over the cone, said cone having an annular bead at its base adjacent the abutment face to compress the inner wall portion of the hose when engaging the face, and advancing and anchoring means for the sleeve to force the cone into the end of a hose and expand the hose over the cone and against the flaring wall portion of the sleeve and against said abutment face for sealing and holding the coupling to the hose.

7. A coupling for hose having a spiral inner wall liner, comprising an anchoring element with thread projections on its outer surface adapted to be screwed into interlocking engagement with the hose liner to hold the element from pulling out, and a sleeve member having a sleeve for engagement over the end of the hose and having a conical projection in its inner end for entering the end of the hose, said sleeve member having an advancing connection with the anchoring element for moving the sleeve over the hose and projecting the conical projection into the end of the hose to expand and compress the hose over the projection and against the inner wall and the inner end of the sleeve.

8. A coupling for hose having a spiral inner wall liner, comprising an anchoring nipple having external coarse screw threads on its inner end adapted to be screwed into the end of a hose into interlocking engagement with the spiral liner and having fine screw threads on its outer end, and a sleeve member having a sleeve for engagement over the end of the hose and having an annular inner end wall providing a sealing abutment for the extremity of the hose, said annular wall terminating in a conical projection extending forwardly in spaced relation within the sleeve for engagement in the end of the hose, said conical member having internal fine screw threads for engagement over the fine threads on the anchoring nipple, whereby the sleeve member may be turned up on the nipple to force the conical projection into the hose end and radially and longitudinally expand the same against the inner wall and the sealing abutment of the sleeve member.

9. In combination with a hose, a nipple for insertion in the end of the hose, said hose and nipple having interlocking portions to hold the nipple in the hose, a cone threaded on the outer end of the nipple for wedging engagement into the outer end of the hose to expand the same, and a sleeve spaced about the cone for engagement over the end of the hose to receive the expanded hose against its inner wall, the end portion of the sleeve being flared about the cone and terminating in an annular wall at the base of the cone for receiving the extremity of the hose thereagainst to seal the hose in the sleeve.

10. In combination with a hose, a nipple for insertion in the end of the hose, said hose and nipple having interlocking portions to hold the nipple in the hose, a cone threaded on the outer end of the nipple for wedging engagement into the outer end of the hose to expand the same, and a sleeve spaced about the cone for engagement over the end of the hose to receive the expanded hose against its inner wall, the end portion of the sleeve being flared about the cone and terminating in an annular wall at the base of the cone for receiving the extremity of the hose thereagainst to seal the hose in the sleeve, said cone having an annular rib adjacent the annular wall to engage the inner portion of the hose for compressing the same and effecting a tight stepped sealing joint.

11. A coupling for hose having a metal spiral armor liner wound in one direction, comprising an anchoring nipple having coarse screw threads on its inner end extending in the same direction as the convolutions of the liner and adapted to be screwed into the spiral liner of the hose in a direction tending to expand the liner and the outer portion of the hose to hold the nipple therein, said nipple having a reduced outer end with fine screw threads in the same direction as the convolutions of the spiral liner, and a cone member having internal threads for engaging the fine threads of the nipple and adapted to be turned up thereon for wedging the cone member into the end of the hose with a rotation tending to unwind and expand the convolutions of the spiral liner, said cone member also longitudinally compressing the portion of the hose flaring over the cone member and between the latter and the zone of anchorage of the nipple in the hose to radially expand the said portion of the hose, said cone member also having a spaced concentric sleeve sealed at its inner end about the cone member and adapted for advancement over the end of the hose during the feeding of the cone member into the end of the hose, said sleeve having a flaring inner wall at its end adapted to receive the end of the hose and to receive the expanded nipple anchoring portion of the hose when the cone member is in place, the inner wall and the inner sealed end of the sleeve adapted to receive the expanded and compressed outer portion and end of the hose thereagainst to seal the coupling on the hose.

12. A hose coupling comprising a sleeve adapted to fit over the end of a hose and having its inner wall flared toward the inner end of the sleeve and terminating in an annular convex abutting shoulder, said sleeve having a cone extending into the flared inner portion of the sleeve from the inner marginal edge of said shoulder, and anchoring means for engagement within the hose and adapted for engagement with said cone for advancing and holding the cone into and in the end of the hose to expand the latter against the flaring inner wall of the sleeve and against said convex abutting shoulder.

13. A hose coupling comprising a sleeve for engagement over the end of a hose and having a concentric cone in the inner end of the sleeve for engagement within the end of the hose, the wall of the sleeve surrounding the cone being flared to provide an outwardly flaring annular space for the reception of the expanded end of the hose and terminating in a sealed shoulder connecting the inner ends of the sleeve and cone, said shoulder having a convex face and having a bead at its inner marginal portion adapted to compress and deform the extremity of the hose and the inner wall portion thereof, and anchoring means adapted to be fitted within the hose to engage the cone for advancing the same and the sleeve within and over the end of the hose.

14. A hose coupling comprising an anchoring nipple for engagement in the end of a hose and having a projecting portion for interfitting the inner wall of the hose, said nipple having a reduced exteriorly threaded portion at its outer end, a clamping ring fitting over the hose opposite said projection of the nipple to bind the hose on the nipple and anchor the latter in the hose, and a sleeve for engagement over the end of the hose and having a counterbore for the reception of said ring and having an abutting shoulder at the inner end of the sleeve for engaging the extremity of the hose, said sleeve also having a forwardly projecting cone at the inner marginal edge of the shoulder within internal threads for engagement with the threaded end of the nipple, whereby turning of the sleeve and cone is adapted to advance the cone into the end of the hose and compress and expand the latter into engagement with the inner wall of the sleeve and against said abutting shoulder.

15. A hose coupling comprising an anchoring nipple having an enlargement on its inner end for engagement in the wall of the hose and a reduced threaded outer end, a binding ring for engagement over the end of the hose and adapted for positioning thereabout in the zone of the enlargement of the nipple to lock the hose to the nipple, a sleeve for slidable engagement over the hose and having a concentric cone in the inner end of the sleeve connected thereto by an annular abutting shoulder, the inner wall of the sleeve about the cone being flared to provide with the cone an annular flaring pocket, said cone having internal threads for engagement over the threaded end of the nipple to advance the cone within the end of the hose and the sleeve over the hose to expand the end of the hose into said annular flaring pocket and against said shoulder to seal the hose in the sleeve.

16. A coupling for hose, comprising a sleeve member having a sleeve portion for engagement over the end of a hose and having an annular abutment wall at its inner end, and an anchoring element adapted to be secured in the hose inwardly of the end thereof and adapted for adjustable connection with the sleeve member for advancing the sleeve over the hose end and binding and sealing the end of the hose against said annular abutment wall.

17. A hose coupling comprising an outer member provided with a bore to receive the end of a hose, said member having an interior abutment wall outwardly of the inner end of the member, and a combined anchoring and hose compressing member secured in the hose inwardly of the end thereof and threaded into the outer member and adapted to force that portion of the hose within the outer member against said interior abutment wall whereby to compress the hose against said abutment wall.

18. A coupling for hose, comprising an external sleeve for engagement over the end of a hose and having an internal projection sleeve within its inner end to engage within the end of the hose and providing between said sleeves an annular pocket closed at its inner end, and an anchoring element adapted to engage the inside wall of the hose inwardly of the end thereof and adjustably connected to said internal projection sleeve, whereby said sleeves may be advanced against the extremity of the hose for compressing the end of the hose between the sleeves and sealing the extremity of the hose against the inner annular wall of said pocket.

ALBERT J. SCHOLTES.